United States Patent
Gonzalez et al.

(10) Patent No.: US 8,810,575 B2
(45) Date of Patent: Aug. 19, 2014

(54) INFOGRAPHIC DISK ACTIVITY INTERFACE AND METHOD FOR DISPLAYING RELATIVE SATURATION OF A COMPUTER DISK SYSTEM

(75) Inventors: Gregory Herbert Gonzalez, Huntersville, NC (US); John Brooke Philpott, Charlotte, NC (US)

(73) Assignee: SQL Sentry, Inc., Huntersville, NC (US)

( * ) Notice: Subject to any disclaimer, the term of this patent is extended or adjusted under 35 U.S.C. 154(b) by 1088 days.

(21) Appl. No.: 12/733,219

(22) PCT Filed: Sep. 17, 2008

(86) PCT No.: PCT/US2008/010825
§ 371 (c)(1),
(2), (4) Date: Feb. 17, 2010

(87) PCT Pub. No.: WO2009/038723
PCT Pub. Date: Mar. 26, 2009

(65) Prior Publication Data
US 2010/0214298 A1    Aug. 26, 2010

Related U.S. Application Data

(60) Provisional application No. 60/994,107, filed on Sep. 17, 2007.

(51) Int. Cl.
G06T 11/20    (2006.01)
G06F 11/32    (2006.01)
G06F 3/06    (2006.01)

(52) U.S. Cl.
CPC ............ G06F 11/324 (2013.01); *G06F 3/0601* (2013.01); *G06F 2003/0697* (2013.01)
USPC .......................................... 345/440; 717/127

(58) Field of Classification Search
None
See application file for complete search history.

(56) References Cited

U.S. PATENT DOCUMENTS 6,901,582 B1    5/2005    Harrison
7,382,371 B1 *  6/2008    Ciabarra ........................ 345/440

OTHER PUBLICATIONS

Cameron et al. (PARAMICS—Parallel Microscopic Simulation of Road Traffic, Journal of Supercomputing, 10, 25-53, 1996).*

* cited by examiner

*Primary Examiner* — Kee M Tung
*Assistant Examiner* — William Beutel
(74) *Attorney, Agent, or Firm* — Schwartz Law Firm, P.C.

(57) ABSTRACT

A computer-readable medium storing instructions which, when executed by at least one processor of a computer system, adapt the computer system to implement a method for displaying relative saturation of a computer disk system. The method includes visually displaying elements of the computer disk system in an infographic disk activity interface. The elements may include at least one of the group including at least one disk controller, at least one physical disk, at least one file, and at least one other files. The elements are visually linked using an arrangement of connectors defining respective data flow paths between the elements. Disk system activity along the data flow paths is visually indicated using static and/or dynamic infographic display elements.

22 Claims, 1 Drawing Sheet

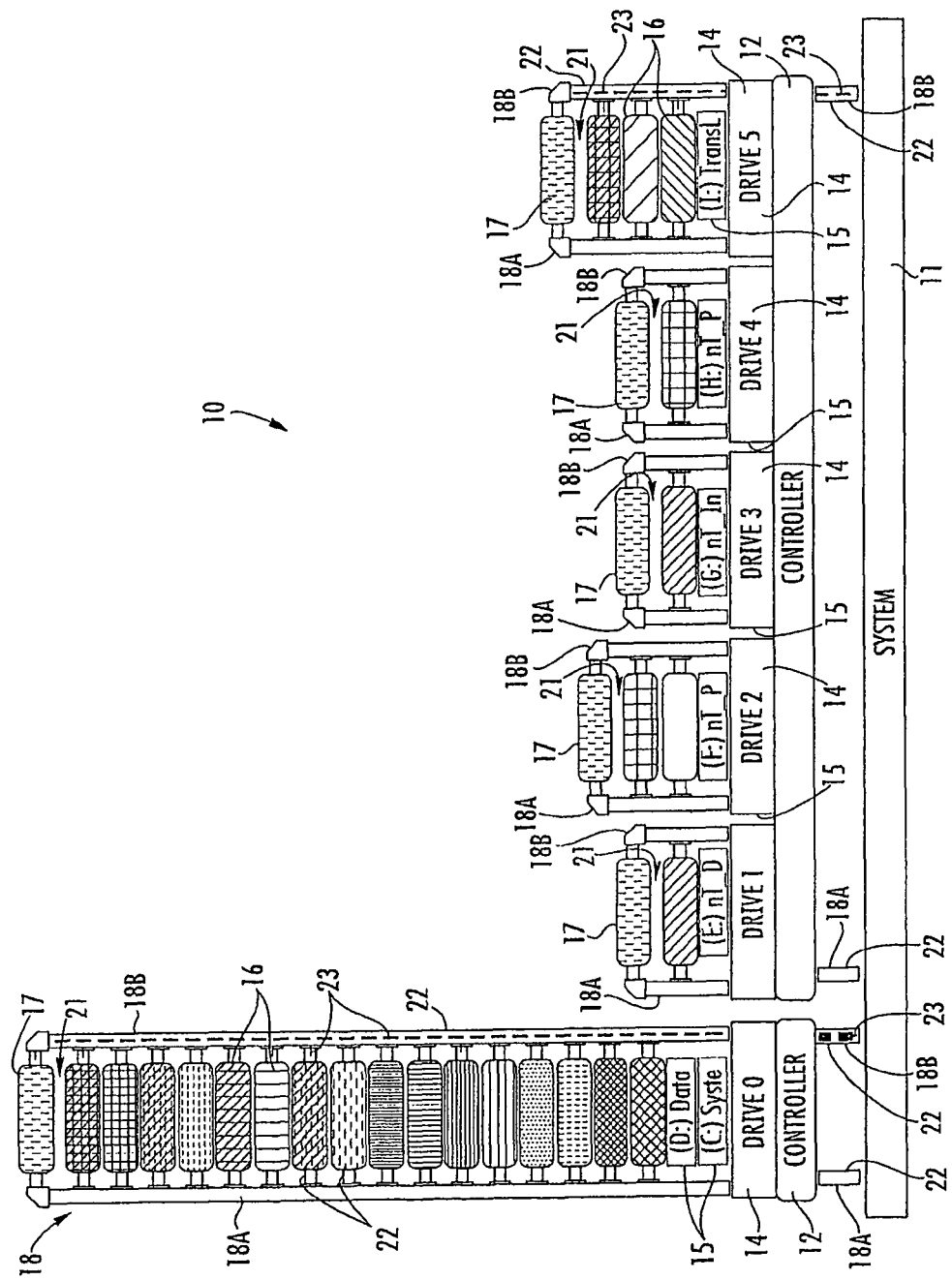

INFOGRAPHIC DISK ACTIVITY INTERFACE AND METHOD FOR DISPLAYING RELATIVE SATURATION OF A COMPUTER DISK SYSTEM

TECHNICAL FIELD AND BACKGROUND

The present disclosure relates broadly to an infographic disk activity interface and method for displaying relative saturation of a computer disk system. In one exemplary implementation, the invention may be utilized to quickly illustrate for end users exactly where disk bottlenecks are occurring on a computer system, in order to help solve troublesome and elusive disk-related performance issues. The present interface may use various metrics collected from different computer subsystems, and application of formulas and visual rendering techniques to present the disk system activity to the user in an intuitive, meaningful fashion.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

According to one exemplary embodiment, the invention may comprise a computer-readable medium storing instructions which, when executed by at least one processor of a computer system, adapt the computer system to implement a method for displaying relative saturation of a computer disk system. The method includes visually displaying elements of the computer disk system in an infographic disk activity interface. The term "infographic" refers broadly herein to any visual representation of information, data or knowledge. The elements may comprise at least one of the group consisting of at least one disk controller, at least one physical disk, at least one file, and at least one other files. The elements are visually linked using an arrangement of connectors defining respective data flow paths between the elements. Disk system activity along the data flow paths is visually indicated using static and/or dynamic infographic display elements.

According to another exemplary embodiment, for each element displayed, the connectors comprise an inbound connector representing a data write path (to the controller, physical disk or file), and an outbound connector representing a data read path (to the controller, physical disk or file).

According to another exemplary embodiment, each connector comprises a static path boundary defined by first and second solid equidistant lines.

According to another exemplary embodiment, each connector further comprises an inner graphic within the path boundary, and representing relative disk activity along the data flow path.

According to another exemplary embodiment, in a real-time mode, the inner graphic comprises a moving segmented line. Alternatively, the inner graphic may comprise any moving or non-moving icon, symbol, image, or other representation.

According to another exemplary embodiment, in a real-time mode, a width of the moving segmented line changes dynamically in response to varying levels of path saturation.

According to another exemplary embodiment, the inner line width change is dampened between sample readings of data flow path saturation.

According to another exemplary embodiment, in a real-time mode, a color of the moving segmented line changes dynamically in response to varying levels of path saturation.

According to another exemplary embodiment, in a real-time mode, a speed of the moving segmented line changes dynamically in response to varying levels of path saturation.

According to another exemplary embodiment, in a real-time mode, a width and color of the segmented line changes simultaneously and dynamically in response to varying levels of path saturation.

According to another exemplary embodiment, in a historical mode, the inner graphic comprises a colored, non-moving solid line.

Alternatively, exemplary embodiments of the invention may comprise an infographic disk activity interface, and computer-implemented method for displaying relative saturation of a computer disk system.

Embodiments of the present invention, including any part(s) or function(s) thereof, may be implemented using hardware, software, firmware, or a combination thereof, and may be implemented in one or more computer systems or other processing systems. In one exemplary embodiment, the invention may be directed toward one or more computer systems capable of carrying out the functionality described herein. An example of a computer system useful for implementing the present invention may comprise a computer (or processor), which in an exemplary embodiment may be a personal computer (PC) system running any commercially available operating system such as WINDOWS MOBILE™ for POCKET PC, or MICROSOFT® WINDOWS® XP/Vista, etc. available from MICROSOFT® Corporation of Redmond, Wash., U.S.A., Mac/OS from APPLE® Corporation of Cupertino, Calif., U.S.A., or any of various versions of UNIX® (a trademark of the Open Group of San Francisco, Calif., USA) including, e.g., LINUX®, HPUX®, IBM AIX®, and SCO/UNIX®.

The above platforms are provided by way of example only. Indeed, the invention may be implemented on any appropriate computer system running any appropriate operating system. In one exemplary embodiment, the present invention may be implemented on a computer system incorporating components such as, for example, a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, and the like.

The computer system may include one or more processors which may be connected to a communication infrastructure, such as a communications bus and network. Various exemplary software embodiments may be described in terms of this exemplary computer system. The exemplary computer system may include a display interface that may forward graphics, text, and other data from the communication infrastructure (or from a frame buffer) for display on the display unit. The computer system may also include computer-readable mediums, for example, a main memory, random access memory (RAM), and a secondary memory. The secondary memory may include, for example, a hard disk drive and/or a removable storage drive, representing a floppy diskette drive, a magnetic tape drive, an optical disk drive, or a compact disk drive CD-ROM. The removable storage drive may read from and/or write to a removable storage unit in a well known manner. Removable storage unit, also called a program storage device or a computer program product, may represent a floppy disk, magnetic tape, optical disk, or compact disk which may be read from and written to by removable storage drive. As will be appreciated, the removable storage unit may include a computer usable storage medium having stored therein computer software and/or data.

In alternative exemplary embodiments, secondary memory may include other similar devices for allowing computer programs or other instructions to be loaded into the computer system. Such devices may include, for example, a removable storage unit and an interface. Examples of such may include a program cartridge and cartridge interface such as those found in video game devices, a removable memory chip such as an erasable programmable read only memory (EPROM), or programmable read only memory (PROM) and associated socket, and other removable storage units and interfaces, which may allow software and data to be transferred from the removable storage unit to computer system.

The computer system may also include input and output devices, such as those commonly known and utilized in the art. Examples of input devices include a mouse or other pointing device, such as a digitizer, and a keyboard or other data entry device. Examples of output devices include a display unit and display interface (e.g., display screen, monitor, etc.). Additionally, the computer system may include input/output (I/O) devices such as a communications interface, cable and communications path. These devices may include, for example, a network interface card, and modems.

The communications interface may allow software and data to be transferred between the computer system and external devices. Examples of communications interface may include a modem, a network interface (such as an Ethernet card), a communications port, and a Personal Computer Memory Card International Association (PCMCIA) slot and card. Software and data transferred via the communications interface may be in the form of signals which may be electronic, electromagnetic, optical or other signals capable of being received by the communications interface. These signals may be provided to communications interface via a communications path (e.g., channel). This channel may carry signals, which may include propagated signals, and may be implemented using wire or cable, fiber optics, a telephone line, a cellular link, an radio frequency (RF) link and other communications channels.

BRIEF DESCRIPTION OF THE DRAWING

The description of exemplary embodiments proceeds in conjunction with the following drawing, in which FIG. 1 is an instance of the present disk activity interface (DAI) implemented in a database management system (DBMS) environment.

DESCRIPTION OF EXEMPLARY
EMBODIMENTS AND BEST MODE

The present invention is described more fully hereinafter with reference to the accompanying drawings, in which one or more exemplary embodiments of the invention are shown.

Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at lease one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterite) is not intended to indicate or imply that the invention has been previously reduced to practice or that any testing has been performed.

In one exemplary embodiment, the present disk activity interface (DAI) provides a database issue discovery and infographic display—via any conventional output device—designed to enable users, such as database administrator's (DBA's), to readily identify, diagnose, and resolve enterprise-wide database performance problems within a database management system (DBMS) environment. The infographic display gives DBA's a basic overview of the overall system health, and enables them to readily determine underlying server contention issues and processes in real-time and historical modes. The DAI may further illustrate where performance bottleneck occur, and may facilitate the process of tuning the disk system.

The term "DBMS" refers broadly to any computer software designed for the purpose of managing and querying databases. Typical commercial examples of DBMSs include Oracle®, DB2®, Microsoft Access®, Microsoft SQL Server®, PostgreSQL®, MySQL® and FileMaker®. DBMSs are typically used by DBA's in the creation of database systems.

The term "database" is defined as any structured collection of records or data that is stored in a computer so that a program can consult it to answer queries. The records retrieved in answer to queries become information that can be used to make decisions.

The "database administrator" (DBA) refers to a person who is responsible for the environmental aspects of a database. In general, these may include (for example) creating and testing backups, verifying data integrity, defining and/or implementing access controls to the data, ensuring maximum uptime, ensuring maximum performance, and helping programmers and engineers to efficiently utilize the database.

The present DAI may be implemented as one or a combination of instructions, algorithm(s), computer program(s), and/or software stored on a computer-readable medium, which may be read and executed by a computing platform, such as a general purpose computer, to perform the operations described below. Minimum hardware requirements may include, for example, a 600 MHz or higher processor, 256 MB of RAM, and 15 MB of hard disk space.

The exemplary DAI utilizes two display modes, "real-time" and "historical". In real-time mode, the DAI uses continuously updated animated lines to show current disk activity. In this mode, a baseline for normal activity and predefined thresholds may be set, such that users may be alerted (e.g., via e-mail) when the DAI detects performance bottlenecks of any kind. In historical mode, static lines are used to show the average activity between a start and end time specified by the user.

I. Elements of Disk Activity Interface (DAI)

FIG. 1 illustrates an exemplary embodiment of the DAI 10 in a dynamic real-time mode. A similar infographic display may be utilized to illustrate a predefined (or static) historical overview, discussed below. Various elements of the DAI 10 may comprise, for example, one or a plurality of the following: a computer Disk System 11, Disk Controller 12, Physical Disk 14, Logical Disk 15, Files 16, Other Files 17, and Connectors 18. Each of these elements is discussed separately below.

Computer Disk System 11

In the exemplary embodiment, the Disk System 11 element of the DAI 10 is a logical representation of a physical computer's entire disk system. Thus, in this implementation, there is only one system element per computer system. There may be multiple operating system software (OS) instances installed on a computer system that share the same disk system. In this scenario, there is typically one primary and one or more virtual OS instances.

Disk Controller 12

The Disk Controller element is shown adjacent the Disk System 11. The Disk Controller 12 is a hardware component that controls the flow of data into and out of one or more of the Physical Disks 14. The Disk System 11 can have multiple Disk Controllers 12, each with zero or more Physical Disks 14 operatively connected thereto. In the case of multiple Disk Controllers 12, the controllers are presented top to bottom in the DAI in the order which they are discovered on the computer system. The Disk Controller 12 may be integrated into the Disk System 11, and may provide RAID capability. RAID combines physical hard disks into a single logical unit to provide performance and/or fault tolerance benefits, and can be used on servers, workstations, and external storage devices.

Physical Disk 14

One or more Physical Disk elements are displayed in the DAI 10 adjacent each Disk Controller 12. The Physical Disk 14 may be a collection of one or more physical hard disk drives which are recognized as a single logical unit by the primary OS instance. While it is possible for a Disk Controller 12 to have zero Physical Disks 14 operatively attached, the exemplary DAI 10 only displays controllers with at least one Physical Disk 14 since the others may not be relevant to disk performance. When there are multiple Physical Disks 14, the disks are presented top-to-bottom in the order in which they are discovered from the primary OS instance.

Logical Disk 15

Each Physical Disk 14 is partitioned into one or more Logical Disks 15 displayed in the DAI 10 adjacent each Disk Controller 12. The Logical Disk 15 is not a physical entity, but rather an OS entity created primarily for organizational purposes, and serves as the container for OS files. A Logical Disk 15 can also span multiple Physical Disks 14. Each Logical Disk 15 in the Disk System 11 is given a letter or index (and perhaps an additional label), so that within the OS the Logical Disks 15 may be easily identified. On each Physical Disk 14, the Logical Disks 15 are arranged (e.g., left-to-right) ordered by the drive letter and/or index. In the case of a Logical Disk 15 that spans multiple Physical Disks 14, the Logical Disk 15 will display on all such Physical Disks 14.

Files 16

The Files of the DAI 10 are displayed adjacent respective Logical Disks 15 in a columnar display format. A File 16, like a Logical Disk 15, is an OS entity which may comprise a sequence of binary digits. These binary digits may represent integer values or text characters, or anything else. A Logical Disk 15 may have many Files 16, but for the purpose of the exemplary DAI, only the specific Files 16 most relevant to the user and the application of the software are displayed. Files 16 are arranged (e.g, end-to-end) on a Logical Disk 15 until a gap 21 is reached. After the gap 21, there will either be a new Logical Disk 15 (if the Physical Disk 14 contains more than one Logical Disk 15) or the element Other Files 17, described below.

Other Files 17

The Other Files element is displayed in the DAI 10 at the far right of any Physical Disk 14, and is separated from the nearest File 16 by gap 21. Other Files 17 comprise an abstraction of all other files on the Physical Disk 14 that are not represented by individual file elements. This information may be important to the user because activity associated with those other files can also impact disk performance.

Connectors 18

Connectors 18 are used to visually join the various disk elements discussed above, and represent the path along which data flows from one element to the next. The Connectors 18 may serve multiple purposes, such as providing a visual illustration of Disk System 11 hierarchy by indicating which elements are logically connected. A second purpose is to illustrate relative saturation (activity) and/or bottlenecks along the paths between the elements.

Each Disk Controller 12, Physical Disk 14, and File 16 element has both an Outbound Connector 18A and an Inbound Connector 18B, representing the data write path and data read path, respectively. Each Connector 18 is comprised of two parts: an outer, static path boundary (or "pipe") 22, and an inner line 23 (or other graphic) representing the relative activity along the path. The purpose of the inner line 23 is to highlight path activity, or relative saturation, at any point in the Disk System 11. When in real-time mode, the inner line 23 is a dynamic, constantly moving segmented-line. In historical mode, the inner line 23 is a static (non-moving) and solid (non-segmented) line.

The logic used for determining and displaying the color and width of the inner line 23 varies depending on the element associated with the line 23, and is described in the next section below. A relatively wide red inner line 23, for example, may imply a high level of path saturation (typically a negative condition requiring attention), while a relatively thin green inner line 23 implies a lower level of saturation (typically a positive condition). Various color shades between red and green may be used to represent relative saturation levels between the applicable minimum and maximum values for the element. These minimum and maximum values are described in more detail below. The absence of an inner line 23 in the connector 18 indicates a near zero or negligible saturation, rather than a total absence of IO throughput. When in real-time mode, the inner line 23 can change dynamically in both width and color, either separately or simultaneously. Alternatively, the speed at which the inner line 23 moves and/or the density (i.e., spacing) of the dashed segments can also be adjusted to indicate relative path saturation. Using the Connectors 18 in the DAI 10, DBA's and other users can quickly pinpoint where IO bottlenecks lie within the overall OS architecture.

II. SQL Server Implementation

One exemplary embodiment, the DAI 10 is integrated in a client-server DBMS product that can respond to queries from client machines formatted in the SQL language. While the present disclosure relates particularly to the SQL Server by Microsoft®, it is understood that the concepts and features described herein are in no way limited to a particular DBMS environment (or any other particular software, hardware, or firmware application).

A. Element Discovery

An initial step in implementing the exemplary DAI 10 is to designate (or "discover") the various elements to be illustrated in the infographic display.

(i) Computer Disk System 11

Referring again to FIG. 1, the computer Disk System 11 represented by the DAI 10 is specified by the user. If a computer system has multiple OS instances installed, the user may specify the well-known (e.g., commercial) name of the primary OS instance, and any virtual OS instances are then discovered by connecting to the primary OS instance and enumerating them.

(ii) Disk Controller 12

Disk Controllers 12 are discovered from the primary OS instance using Windows Management Instrumentation (WMI) objects Win32_SCSIController and Win32_IDEController. WMI is a set of extensions to the Windows Driver Model that provides an operating system interface through which instrumented components provide information and notification. WMI is Microsoft's implementation of the Web-Based Enterprise Management (WBEM) and Common Information Model (CIM) standards from the Distributed Management Task Force (DMTF). WMI allows scripting languages like VBScript or Windows PowerShell to manage Microsoft Windows personal computers and servers, both locally and remotely. The purpose of WMI is to define a non-proprietary set of environment-independent specifications which allow management information to be shared between management applications that run in diverse enterprise operating system environments. Since there are different types of common controllers, collections for those types are enumerated to find the total controller count in the Disk System 11.

(iii) Physical Disk 14

To obtain the Physical Disks 14 on each Disk Controller 12, a W-SQL associator query is used to retrieve associated PnpEntities (Win32_PnPEntity):

```
ASSOCIATORS OF {{Win32_SCSIController.DeviceID='DEVICEIDOFCONTROLLER'}} WHERE
    AssocClass = Win32_SCSIControllerDevice ResultClass=Win32_PnPEntity")
```

Each PnpEntity is then enumerated, and a lookup is performed for each on the corresponding Win32_DiskDrive:

```
SELECT*FROM Win32_DiskDrive WHERE
    PnPDeviceID="{PnpDeviceID}"
```

Backslashes in the DeviceID may be escaped (or reformatted) by duplicating each backslash.

(iv) Logical Disk 15

The Logical Disk 15 to Physical Disk 14 relationship may be many-to-many, and may be joined via a partitions table. A Logical Disk 15 can span multiple partitions, and a Physical Disk 14 can have multiple partitions. For this reason, partition information for each Physical Disk 14 as well as each logical disk partition may be stored in a table so that the relationships between the two can be mapped. To retrieve this information from the primary OS instance, the partitions on each Physical Disk 14 are first enumerated using a W-SQL associator query:

```
ASSOCIATORS OF {{Win32_DiskDrive.DeviceID='DEVICEIDOFPHYSICALDISK'}} WHERE
    AssocClass = Win32_DiskDriveToDiskPartition
```

The Logical Disks 15 are then retrieved using the WMI object Win32_LogicalDisk on the Disk System 11 with a DriveType of Local_Disk. Each Win32_LogicalDisk is enumerated, and a W-SQL associator query is used to retrieve the associated partitions:

```
ASSOCIATORS OF {{Win32_LogicalDisk.DeviceID='DEVICEIDOFLOGICALDISK'}} WHERE
    AssocClass = Win32_LogicalDiskToPartition
```

With this information, it is determined which Logical Disks 15 are available on each Physical Disk 14 by traversing from the physical disk partitions, to the logical disk partitions, and then to Logical Disks 15.

Logical Disks 15 are retrieved for any virtual OS instances in the same fashion, and the Physical Disks 14 on which they reside are stored. Using this information, for any SQL Server Files 16 from a virtual OS instance, the Physical Disks 14 on which they reside can be determined.

(v) SQL Server Files 16 (e.g., Data and Transaction Log Files)

To retrieve SQL Server File information, all of the SQL Server instances installed on all OS instances on the computer system are first enumerated. The SQL Server instances can either be specified by the user or auto-discovered.

Next, all databases on each SQL Server instance may be retrieved using the following T-SQL query:
SELECT*FROM master.dbo.sysdatabases The Files 16 associated with each database are then enumerated using the following T-SQL query:
SELECT*FROM dbo.sysfiles Each File 16 has a FileName that indicates its full path, or location, on the Logical Disk 15. This path information is used to determine on which Logical Disk 15 and Physical Disk 14 each File 16 resides.

B. Calculating and Rendering Path Saturation

In real-time mode, all calculations are performed over a specified time sample interval which remains constant throughout the user session, and the inner path saturation lines 23 for Connectors 18 are updated dynamically and continuously. In historical mode, the start time and end time of the time sample are specified by the user. The average path saturation over the specified time period is calculated using the same formulas and processes described herein for real-time analysis; however the inner lines 23 of Connectors 18 are solid and static.

Average Seconds/IO is the amount of time in seconds to read or write to the specified element during a sample interval. Total IO is the number of individual reads or writes to the specified element during a sample interval. Total Bytes is the number of bytes read or written to the specified element during a sample interval. In this implementation, inbound metrics are computed in the same way as outbound metrics, just using different input values that come from the subsystem being monitored.

For Physical Disks 14, the default maximum allowed value (DiskMaxAllowedSecondsPerIO) is derived from generally accepted measures for the point at which disk IO latency, or "average seconds per IO", is indicative of a disk bottleneck that may be impacting the performance of the Disk System 11.

To compute path saturation for Physical Disks 14, each Disk Controller 12 is enumerated, and for each Disk Controller 12, each disk drive element is enumerated. If the Total IO for any Physical Disk 14 is less than a specified minimum allowed count, then the Average Seconds/IO for that disk is forced to zero. This is because in certain systems there can be high latency when there is very little disk activity; but if the Total IO is very low, the Average Seconds/IO is essentially irrelevant to overall disk performance.

All SQL Server Files 16 on a Physical Disk 14 are enumerated by first adding the Total Bytes across all of the files. Next, the Total IO Seconds during the sample interval across all of the files is divided by the Total IO across all the files to obtain the Average Seconds/IO across all of the files. Because there are often timing discrepancies between counter metrics at the physical disk level and at the file level, the disk Total Bytes metric (DiskTotalBytes) used for the rest of the calculations becomes the greater of the physical disk Total Bytes, or the sum of Total Bytes for all of the SQL Server Files 16 on the Physical Disk 14. Whichever system is used to create Disk-TotalBytes (disk or SQL Server file) becomes the same system used for the disk Average Seconds/IO metric (AvgSecondsPerIO). Thus, if disk Total Bytes are greater than the SQL Server files Total Bytes for either reads or writes, then disk Average Seconds/IO metrics are used for both read and write calculations. Likewise, if SQL Server files Total Bytes are greater, the SQL Server file Average Seconds/IO metrics are used. The SQL Server files Total Bytes is then subtracted from DiskTotalBytes to find the Total Bytes related to Other Files 17 (OtherFilesTotalBytes). If OtherFilesTotalBytes is less than a specified number of bytes it is deemed insignificant and is thus subtracted from DiskTotalBytes, and then set equal to zero, effectively removing it from the equation.

Each file's Total Bytes (FileTotalBytes) is then divided by DiskTotalBytes to determine the percentage of disk activity related to each File (FilePercentOfDiskActivity).

$$FilePercentOfDiskActivity = FileTotalBytes/DiskTotalBytes$$

The same formula may be applied for the Other Files 17 using OtherFilesTotalBytes.

$$OtherFilesPercentOfDiskActivity = OtherFilesTotalBytes/DiskTotalBytes$$

(i) Determining Inner Line Width

The width of inner line 23 varies in response to the level of path saturation, growing wider as saturation levels increase. The inner line is always constrained by the static path boundary 22, which effectively represents the maximum inner line width (MaxInnerLineWidth). The calculations which follow show how a percentage of a maximum value is calculated for each element (ElementPercentageOfMax). This value is always subsequently multiplied by MaxInnerLineWidth to determine the actual inner line width (InnerLineWidth) rendered.

$$InnerLineWidth = (ElementPercentageOfMax * MaxInnerLineWidth)$$

For each File 16, FilePercentOfDiskActivity is multiplied by AvgSecondsPerIO to calculate a path saturation metric which represents the path saturation level for the file. To determine the width of inner line 23, this metric is divided by the maximum allowed latency value for the file (FileMaxAllowedSecondsPerIO) to calculate the percentage of the maximum (ElementPercentageOfMax). For SQL Server Files 16, FileMaxAllowedSecondsPerIO is derived from generally accepted measures for the point at which IO latency is indicative of a disk bottleneck that is impacting the performance of the SQL Server. This maximum value can change based on the type of IO operation (read or write), as well as the SQL Server file type (data file or transaction log file).

$$ElementPercentageOfMax = (FilePercentOfDiskActivity * AvgSecondsPerIO) / FileMaxAllowedSecondsPerIO$$

For Other Files 17, the width of inner line 23 is determined by dividing the path saturation metric by DiskMaxAllowedSecondsPerIO to calculate the percentage of the maximum (ElementPercentageOfMax).

$$ElementPercentageOfMax = (OtherFilesPercentOfDiskActivity * AvgSecondsPerIO) / DiskMaxAllowedSecondsPerIO$$

To determine the width of inner line 23 for Physical Disks 14, the Average Seconds/IO is divided by DiskMaxAllowedSecondsPerIO to calculate the percentage of the maximum (ElementPercentageOfMax).

$$\text{ElementPercentageOfMax} = \text{AvgSecondsPerIO} / \text{DiskMaxAllowedSecondsPerIO}$$

To determine the width of inner line 23 for Disk Controller 12, Total Bytes is summed for all Physical Disks 14 operatively attached to the Disk Controller 12 (ControllerTotalBytes) and divided by the maximum observed Total Bytes for the Disk Controller 12 (ControllerMaxObservedTotalBytes), which is the greater of ControllerTotalBytes for the current sample (ControllerCurrentTotalBytes) or the largest recorded historical Total Bytes value, to calculate the percentage of the maximum (ElementPercentageOfMax).

$$\text{ElementPercentageOfMax} = \text{ControllerTotalBytes} / \text{ControllerMaxObservedTotalBytes}$$

where $$\text{ControllerMaxObservedTotalBytes} = \text{Max}(\text{ControllerCurrentTotalBytes}, \text{ControllerMaxHistoricalTotalBytes})$$

Alternatively, an analysis can be performed to determine the relationship between controller Total Bytes and saturation levels of Physical Disks 14 connected to a Disk Controller 12 to find the relative controller path saturation for a given IO load.

(ii) Dampening Inner Line Width Changes

When in real-time mode, as the widths of inner line 23 between samples can differ drastically, in order to effectively impart the change in activity to the end user and smooth the transition, the change may be dampened from the previous line width to the new width over time (typically a few seconds), as opposed to changing it immediately. This may be done by using a bounded sin function to map the range 0→1 differently:

$$\text{newTransitionPercent} = \text{Sin}(\pi * \text{transitionPercent} - (\pi/2))/2 + \frac{1}{2}$$

so $$\text{valueCurrent} = \text{value0} + \text{newTransitionPercent} * (\text{value1} - \text{value0})$$

(iii) Inner Line Color

Color for inner lines 23 of Connectors 18 is generated using a linear transition from the base color to the target color. In this case, the base color is red and the target color is green.

$$\text{newTransitionPercent} = \text{Sin}(\pi * \text{transitionPercent} - (\pi/2))/2 + \frac{1}{2}$$
$$\text{Rcurrent} = R0 + \text{newTransitionPercent} * (R1-R0)$$
$$\text{Gcurrent} = G0 + \text{newTransitionPercent} * (G1-G0)$$
$$\text{Bcurrent} = B0 + \text{newTransitionPercent} * (B1-B0)$$
$$\text{CurrentColor} = \text{Color.FromARGB}(\text{Rcurrent}, \text{Gcurrent}, \text{Bcurrent})$$

where
R0, G0, B0 are the colors at the minimum saturation level, in this case green
R1, G1, B1 are the colors at the maximum saturation level, in this case red In real-time mode, when adding or removing inner lines 23 between samples, fade in/out is accomplished by shifting the requested color to a color closer to the background color of the tube, rather than using an alpha channel. This may be done for performance reasons. The functions to perform the fade include:

$$\text{RcurrentAdjusted} = (\text{Rcurrent} - R0) * \text{penFade}) + R0$$
$$\text{GcurrentAdjusted} = (\text{Gcurrent} - G0) * \text{penFade}) + G0$$
$$\text{BcurrentAdjusted} = (\text{Bcurrent} - B0) * \text{penFade}) + B0$$

where
R0, G0, B0 are the background colors of the tube
penFade is the percentage faded, with 1 being no fade and 0 being fully faded (iv) Inner Line Speed As a further (or alternative) visual representation of disk activity, the speed of inner line 23 (LineSpeed) can be adjusted for Disk Controllers 12, Physical Disks 14, Files 16, and Other Files 17 elements. Line speed can be utilized either in combination with line width and/or color, or independently of line width and color. For each element, the line speed is derived using the same formulas used to calculate line width by first determining the percentage of the maximum allowed latency value for the respective element (PercentageOfMaxAllowedSecondsPerIO). This value is subtracted from 1, then multiplied by the maximum possible line speed value (MaximumLineSpeed), and then the maximum of this value or a minimum line speed (MinimumLineSpeed) is used as the line speed. This causes the inner line to move slower the higher the percentage of the maximum allowed latency, until it reaches the minimum line speed threshold.

$$\text{LineSpeed} = \text{Max}(((1.0 - \text{PercentageOfMaxAllowedSecondsPerIO}) * \text{MaximumLineSpeed}), \text{MinimumLineSpeed})$$

C. Data Retrieval (i) Physical Disk 14

For Physical Disks 14, Total Bytes and Average Seconds/IO are collected. Total Bytes is computed by taking the Windows performance counters PhysicalDisk:Disk Read Bytes/sec and PhysicalDisk:Disk Write Bytes/sec for the last sample interval and multiplying the value by the number of seconds in the last sample interval. Average Seconds/IO is determined by reading the value of PhysicalDisk:Avg. Disk Sec/Read and PhysicalDisk:Avg Disk Sec/Write during the previous interval.

(ii) SQL Server Files 16

For SQL Server Files 16, Total Bytes, Total Latency Milliseconds, and Total IO are collected using the following T-SQL queries:

```
SQL Server 2005 or greater:
SELECT * FROM sys.dm_io_virtual_file_stats(null,null)
SQL Server 2000:
SELECT * FROM ::fn_virtualfilestats(-1, -1)
```

As SQL Server stores cumulative totals for all values, current values for each metric are determined by subtracting the last raw value collected by the current raw value collected.

Total Bytes read and written are collected for each File 16, and the current values are calculated as described above. To compute the Average Seconds/IO for reads or writes for all SQL Server Files 16 on a disk, on SQL Server 2005 (e.g.) the Total Latency Milliseconds for reads or writes are summed and multiplied by 1000 to convert the value into seconds, and then divided by the Total IO for reads and writes respectively. SQL Server 2000 (e.g.) contains only a single column for Total Latency Milliseconds, so the same metric is used for both read and write Average Seconds/IO calculations.

III. Alternate Approaches to Represent Disk Activity

A. Average Seconds Per IO Only

In one alternative implementation of the DAI, Average Seconds/IO can be used for all measurements, with the path saturation represented by the percentage of the maximum allowed Average Seconds/IO for that element. One issue with representing data in this way is that in a typical flow diagram, when two tubes merge, the logical outcome is that the merged result will be the sum of the two rates that merged. With inverse rates, however, the results can be seemingly non-intuitive. For example, if you have two tubes with a rate of 2 seconds/liter flowing into a common tube, the overall output of the merged tube is one second per liter, not 4 seconds per liter. The logic being that each tube is flowing at 0.5 liters per second, so in one second they output 1 liter combined, which means the merged tube is flowing at 1 second/liter. Because of this effect, it may not be desirable to use latency alone to achieve an easily interpreted, intuitive result.

B. Rate (Bytes/Sec OR IO/Sec) Only

Using throughput only provides another way of showing how much data is flowing through a disk system. However, every system has different throughput capabilities depending on the hardware, and there are no solid upper bounds that are widely recognized such as exist with disk latency. Therefore, it may not be practical to calculate an upper bound on the throughput for every system without extensive load testing, which is not typically feasible for production systems.

Embodiments of the present invention described above may include apparatuses for performing the operations herein. An apparatus may be specially constructed for the desired purposes, or it may comprise a general purpose device selectively activated or reconfigured by a computer program stored in the device.

Computer programs may include object oriented computer programs, and may be stored in main memory and/or secondary memory and/or removable storage units, also called computer program products. Such computer programs, when executed, may enable the computer system to perform the features of the present invention as discussed herein. In particular, the computer programs, when executed, may enable the computer system to provide a method for displaying an infographic disk activity interface according to an exemplary embodiment of the present invention. Accordingly, such computer programs may represent controllers of the computer system.

In another exemplary embodiment, the invention may be directed to a computer program product comprising a computer-readable medium having computer software stored therein. The computer software, when executed by the processor, may cause the processor to perform the functions of the invention as described herein.

In another exemplary embodiment where the invention may be implemented using software, the software may be stored in a computer program product and loaded into computer system using, for example, a removable storage drive, hard drive or communications interface. The control logic (software), when executed by the processor, may cause the processor to perform the functions of the invention as described herein. The computer software may run as a standalone software application program running atop an operating system, or may be integrated into the operating system.

In yet another embodiment, the invention may be implemented primarily in hardware using, for example, hardware components such as application specific integrated circuits (ASICs), or one or more state machines. Implementation of the hardware state machine so as to perform the functions described herein will be apparent to persons skilled in the relevant art.

Exemplary embodiments of the invention may also be implemented as instructions stored on a computer-readable medium, which may be read and executed by a computing platform to perform the operations described herein. A computer-readable medium may include any mechanism for storing or transmitting information in a form readable by a machine (e.g., a computer). For example, a computer-readable medium may include read only memory (ROM); random access memory (RAM); magnetic disk storage media; optical storage media; flash memory devices; electrical, optical, acoustical or other form of propagated signals (e.g., carrier waves, infrared signals, and digital signals), and others.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Exemplary embodiments of the present invention are described above. No element, act, or instruction used in this description should be construed as important, necessary, critical, or essential to the invention unless explicitly described as such. Although only a view of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

We claim:

1. A non-transitory computer-readable medium storing instructions which, when executed by at least one processor of a computer system, adapt said computer system to implement a method for displaying relative saturation of a computer disk system, said method comprising:
visually displaying elements of the computer disk system in an infographic disk activity interface, said elements comprising at least one of a group consisting of at least one disk controller, at least one physical disk, at least one logical disk, at least one file, and at least one other files;
visually linking said elements using an arrangement of connectors, said connectors defining respective data flow paths between said elements; and
visually indicating disk system activity comprising a relative path saturation of data flow along said data flow paths, the relative path saturation representing activity measurements comprising data flow rate and latency, wherein latency comprises a time to process data flow operations occurring on at least one element of the computer disk system, and wherein visually indicating disk system activity comprises simultaneously representing data flow rate and latency in a single line having at least two visual attributes, whereby the visual attributes indicate data flow rate and latency along respective data flow paths such that relative disk system activity creating a bottleneck of data flow along any given data flow path can be visually determined.

2. A computer-readable medium according to claim 1, wherein for each element displayed, said connectors comprise an inbound connector representing a data write path and an outbound connector representing a data read path.

3. A computer-readable medium according to claim 1, wherein each connector comprises a static path boundary defined by first and second solid equidistant lines.

4. A computer-readable medium according to claim 3, wherein each connector further comprises an inner graphic within said static path boundary, and representing relative disk activity along each data flow path.

5. A computer-readable medium according to claim 4, wherein, in a real-time mode, said inner graphic comprises a moving segmented line.

6. A computer-readable medium according to claim 5, wherein, in a real-time mode, a width of the moving segmented line changes dynamically in response to varying levels of path saturation.

7. A computer-readable medium according to claim 6, and comprising dampening an inner line width change between sample readings of data flow path saturation.

8. A computer-readable medium according to claim 5, wherein, in a real-time mode, a color of the moving segmented line changes dynamically in response to varying levels of path saturation.

9. A computer-readable medium according to claim 5, wherein, in a real-time mode, a speed of the moving segmented line changes dynamically in response to varying levels of path saturation.

10. A computer-readable medium according to claim 5, wherein, in a real-time mode, a width and color of the moving segmented line changes simultaneously and dynamically in response to varying levels of path saturation.

11. A computer-readable medium according to claim 4, wherein, in a historical mode, said inner graphic comprises a colored, non-moving solid line.

12. A computer-implemented method for displaying relative saturation of a computer disk system, said method comprising:
visually displaying elements of the computer disk system in an infographic disk activity interface, said elements comprising at least one of a group consisting of at least one disk controller, at least one physical disk, at least one logical disk, at least one file, and at least one other files;
visually linking said elements using an arrangement of connectors, said connectors defining respective data flow paths between said elements; and
visually indicating disk system activity comprising a relative path saturation of data flow along said data flow paths, the relative path saturation representing activity measurements comprising data flow rate and latency, wherein latency comprises a time to process data flow operations occurring on at least one element of the computer disk system, and wherein visually indicating disk system activity comprises simultaneously representing data flow rate and latency in a single line having at least two visual attributes, whereby the visual attributes indicate data flow rate and latency along respective data flow paths such that relative disk system activity creating a bottleneck of data flow along any given data flow path can be visually determined.

13. A method according to claim 12, wherein for each element displayed, said connectors comprise an inbound connector representing a data write path and an outbound connector representing a data read path.

14. A method according to claim 12, wherein each connector comprises a static path boundary defined by first and second solid equidistant lines.

15. A method according to claim 14, wherein each connector further comprises an inner graphic within said static path boundary, and representing relative disk activity along each data flow path.

16. A method according to claim 15, wherein, in a real-time mode, said inner graphic comprises a moving segmented line.

17. A method according to claim 16, wherein, in a real-time mode, a width of the moving segmented line changes dynamically in response to varying levels of path saturation.

18. A method according to claim 17, and comprising dampening an inner line width change between sample readings of data flow path saturation.

19. A method according to claim 16, wherein, in a real-time mode, a color of the moving segmented line changes dynamically in response to varying levels of path saturation.

20. A method according to claim 16, wherein, in a real-time mode, a speed of the moving segmented line changes dynamically in response to varying levels of path saturation.

21. A method according to claim 16, wherein, in a real-time mode, a width and color of the moving segmented line changes simultaneously and dynamically in response to varying levels of path saturation.

22. A method according to claim 15, wherein, in a historical mode, said inner graphic comprises a colored, non-moving solid line.

* * * * *